INVENTOR.
Karl J. Braun
BY
Thomas S. Ross
ATTORNEY.

Oct. 21, 1958 K. J. BRAUN 2,857,001

RECORD CONTROLLED RECORD REPRODUCING MACHINE

Filed Aug. 9, 1954 13 Sheets-Sheet 2

Inventor
Karl J. Braun

By [signature]
Attorney

Inventor
Karl J. Braun
By [signature]
Attorney

INVENTOR.
Karl J. Braun
BY Thomas S. Ross
ATTORNEY.

INVENTOR.
Karl J. Braun
BY Thomas S. Ross
ATTORNEY.

Oct. 21, 1958 K. J. BRAUN 2,857,001

RECORD CONTROLLED RECORD REPRODUCING MACHINE

Filed Aug. 9, 1954 13 Sheets-Sheet 6

INVENTOR.
Karl J. Braun
BY Thomas S. Rose
ATTORNEY.

INVENTOR.
Karl J. Braun
BY Thomas S. Ross
ATTORNEY.

Oct. 21, 1958 K. J. BRAUN 2,857,001

RECORD CONTROLLED RECORD REPRODUCING MACHINE

Filed Aug. 9, 1954 13 Sheets-Sheet 8

INVENTOR.
Karl J. Braun
BY Thomas S. Ross
ATTORNEY.

Oct. 21, 1958 K. J. BRAUN 2,857,001

RECORD CONTROLLED RECORD REPRODUCING MACHINE

Filed Aug. 9, 1954 13 Sheets-Sheet 9

INVENTOR
BY Karl J. Braun
Thomas S. Ross
ATTORNEY

Oct. 21, 1958 K. J. BRAUN 2,857,001

RECORD CONTROLLED RECORD REPRODUCING MACHINE

Filed Aug. 9, 1954 13 Sheets-Sheet 10

INVENTOR.
Karl J. Braun
BY Thomas S. Ross
ATTORNEY.

RECORD CONTROLLED RECORD REPRODUCING MACHINE

Filed Aug. 9, 1954 13 Sheets-Sheet 11

INVENTOR.
Karl J. Braun
BY
Thomas S. Ross
ATTORNEY.

Oct. 21, 1958 K. J. BRAUN 2,857,001

RECORD CONTROLLED RECORD REPRODUCING MACHINE

Filed Aug. 9, 1954 13 Sheets-Sheet 12

INVENTOR.
Karl J. Braun
BY
Thomas S. Ross
ATTORNEY.

RECORD CONTROLLED RECORD REPRODUCING MACHINE

Filed Aug. 9, 1954 13 Sheets-Sheet 13

INVENTOR.
Karl J. Braun
BY Thomas S. Ross
ATTORNEY.

United States Patent Office 2,857,001

Patented Oct. 21, 1958

2,857,001

RECORD CONTROLLED RECORD REPRODUCING MACHINE

Karl J. Braun, Glenbrook, Conn., assignor to The K. J. Braun Engineering Company, Inc., South Norwalk, Conn., a corporation of Connecticut Application August 9, 1954, Serial No. 448,712

21 Claims. (Cl. 164—114)

This invention relates broadly to record controlled record reproducing machines and more particularly to tag controlled card reproducing machines wherein perforated information sensed or read from small tags or stubs is transferred to conventional tabulating cards, tapes, or the like, or converted for other useful purposes.

Small tags or stubs of the kind prepared upon the tag-marking machine described in U. S. Patent No. 2,708,873, are now extensively used for controlling the buying, selling, distribution, etc., of merchandise. These tags have a plurality of columns of possible perforating positions to receive vital information such as class of merchandise, manufacture number, department, style or article number, color code, date, size, clerk's number, original price and/or reprice, and other desirable or necessary information. This information is applied to the tags in two forms, namely, by printing and by perforated holes.

A plurality of combined locating and feeding holes are punched in the tags simultaneously with, and in definite relation to, the perforated information to enable the tags to be accurately located or positioned for subsequent sensing or reading of the perforated information as fully disclosed in the aforementioned Patent No. 2,708,873.

A machine for sensing or reading tags of the kind above described is disclosed in my Patent No. 2,704,186.

The tag controlled card reproducing machine forming the subject matter of this application utilizes a sensing or reading mechanism substantially identical to that shown in Patent No. 2,704,186, a standard tabulator base, such for example, as the one shown and described in the Patent 2,044,119 to W. W. Lasker, and new and novel means to control the punching mechanism of the tabulator base by tags sensed or read by the sensing or reading mechanism shown in Patent No. 2,704,186.

Broadly stated the present invention provides for selective operation of a decoding and recording means according to information sensed from perforated tags at a sensing station. Control means selectively controls operation of the decoding and recoding means or unit by the sensing means so that the information in one or more tags can be stored for transmission in stored form to effect operation of a card punch or other suitable or desirable means. The control means cooperates with the sensing means to sense the presence or absence of a tag at the sensing station for effecting operation of the decoding and recoding means only in response to perforated portions of tags. The sensing means and control means also cooperate to selectively operate actuated means responsive to the decoding and recoding unit to selectively set one of two groups or sets of actuating parts in position for operation by said recoding unit which materially increases the capacity and usefulness of the mechanism and its applications for converting information from perforated tags to various types of conventional tabulating cards, tapes and the like, and for hookups with computers and various other types of control apparatus used in automatic machines.

The invention further provides for the handling of variable sized tags perforated with primary and secondary groups of coded information or data useful with the features of storing information received from portions of one or more tags for combined transmission in controlling and operating other mechanism so that some of the coded data can be used as a master control for changing the setting of the mechanism to vary the character of its own operation and that of the controlled mechanism automatically in accordance with the coded data supplied by one or more tags. In addition, the mechanism can simultaneously store, convert, transfer and record data and control impulses received from one or more tags.

The present invention therefore contemplates the provision of a tag controlled card reproducing machine that is designed to punch, into tabulating cards or the like information sensed from tags or stubs. For example a "four-position" numerical code is used to record desired information in the tag stubs. This information is then translated by the machine into a different code, for example a "six-position" code, for punching into conventional tabulating cards or the like.

In the embodiment of the invention shown herein, the tag controlled card reproducer is equipped to sense a maximum of forty eight columns from a "master" stub or a "detail" stub. However, due to the repricing mechanism, which will presently be explained, a maximum of thirty columns of information is transferred from a "detail" tag to a tabulating card. The individual tabulating cards reproduced from the stubs therefore may receive a total of seventy eight columns of information or a combination of the information sensed from a "master" stub and individual "detail" stub.

A conventional tabulating card may be divided into separate fields. All "detail" information, or information read from a "detail" stub is punched in one or more fields of the tabulating card and all information sensed or read from a "master stub" is punched in another field or fields of the same tabulating card.

The present invention further comprehends the provision of one or more of the following features:

(1) Determination of the presence or absence of a tag at the tag reading position or station is not necessary thus eliminating the need for the conventional control pin heretofore required in this type of machine.

(2) Means to provide for selective and automatic allocation of data from two tags or stubs to one tabulating card or the like.

(3) Dual sensing and control means to distinguish between a "master" stub and a "detail" stub fed from the tag feeding magazine.

(4) Means controlled by a master stub to: (1) stop the feeding of tabulating cards; (2) retract or wipe out the entire previous master and detail set-up in the card punching mechanism; and (3) read all perforatable positions in the master stub.

(5) Price control mechanism which provides for automatic selection of the latest price punched in the detail stubs and a reading and punching of all prices punched in the master tags or.

(6) Means for simultaneously feeding stubs and cards during each machine cycle.

(7) Means to enable information sensed from a master stub to be retained or stored and then duplicated into all cards punched from succeedingly fed detail stubs.

(8) Manual retract control mechanism to enable an operator to clear all information from the machine when desired.

Other objects, features, and structural details of the invention will be apparent from the following description when read in connection with the accompanying drawings, in which.

Figures 9, 12:
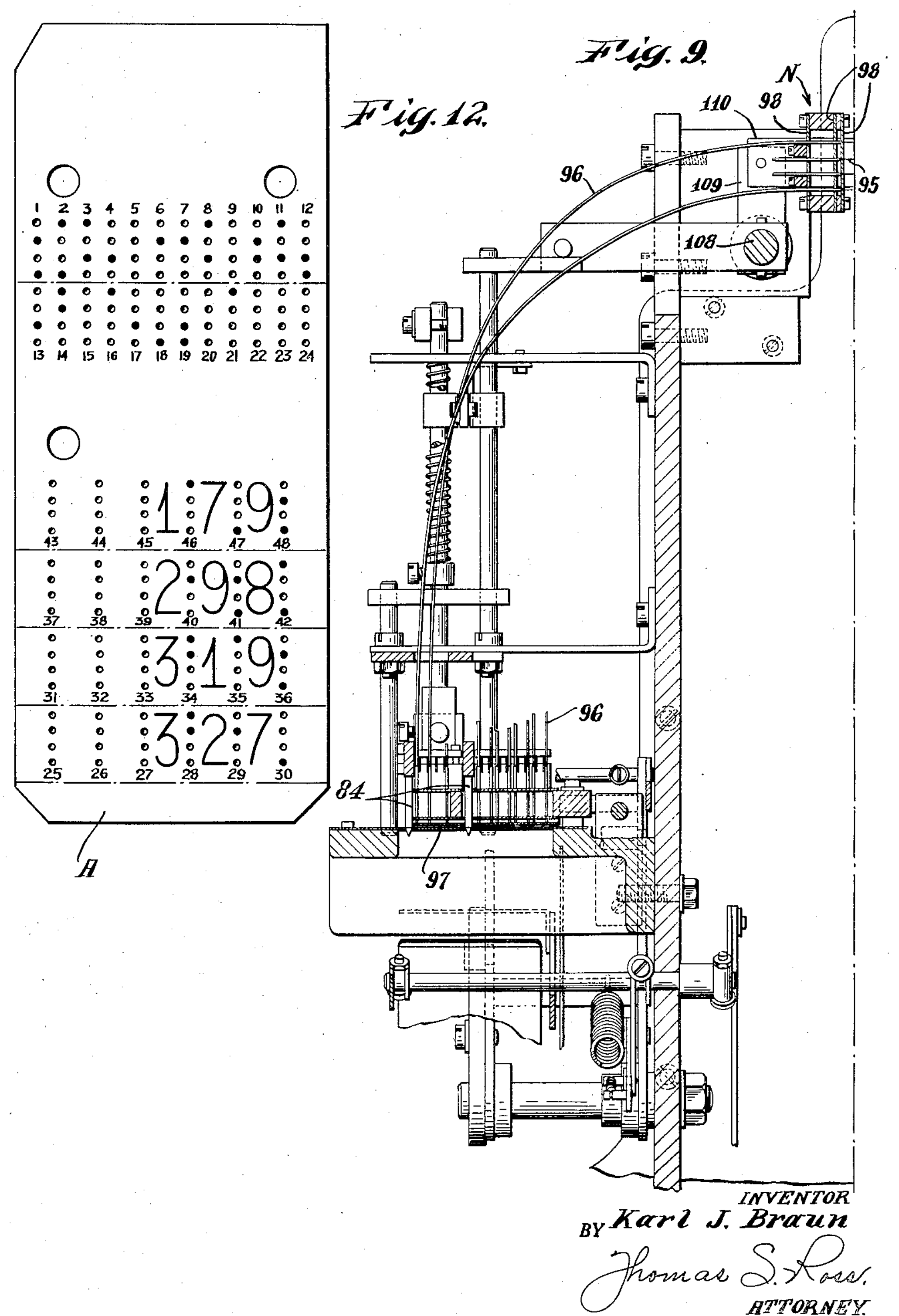
Figure 9A:
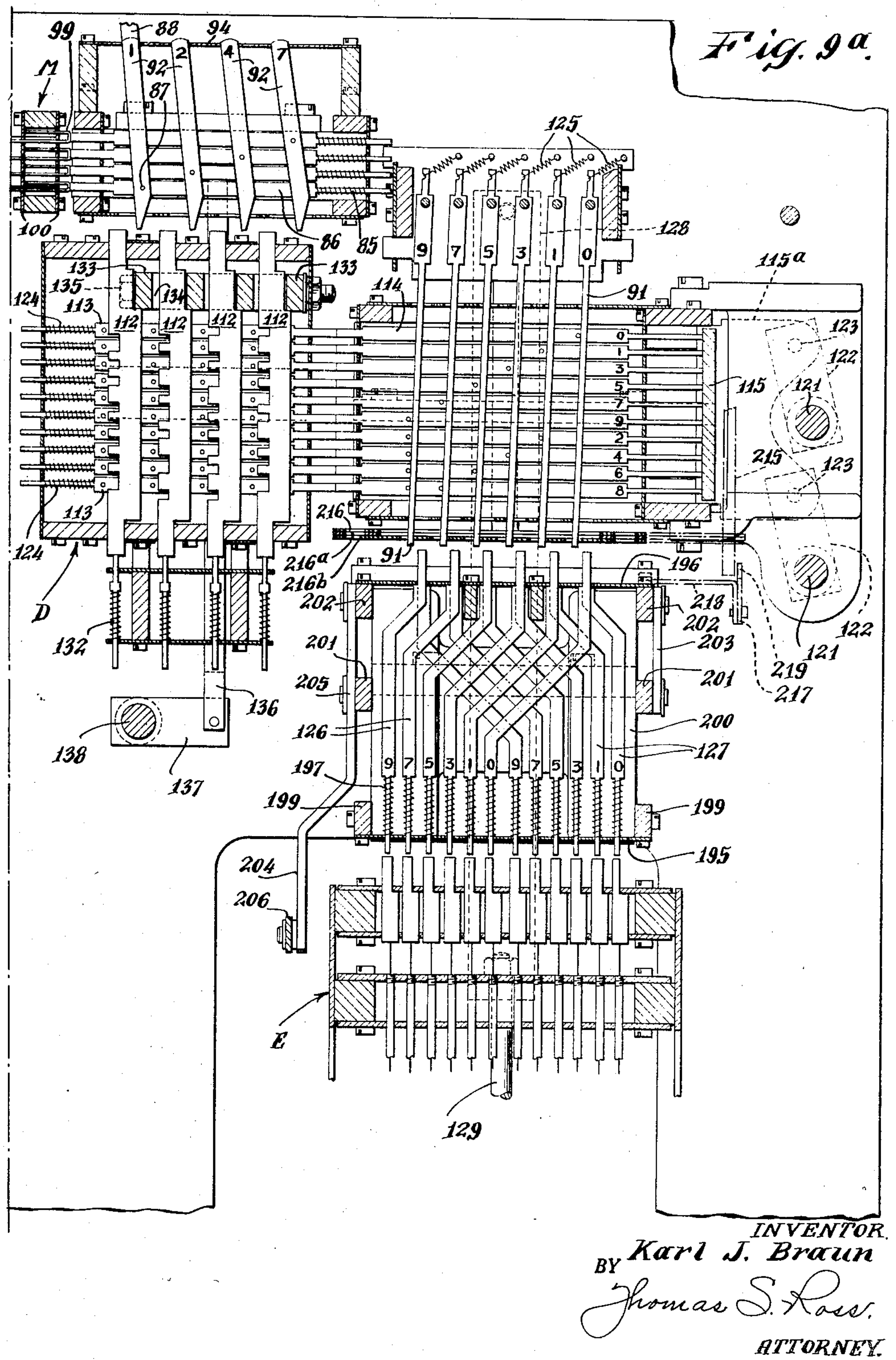

Figs. 9 and 9A together form a fragmentary longitudinal vertical section through the machine to illustrate the tag sensing unit, decoding and recoding units, master shift mechanism and a portion of the upper end of the flexible wiring unit E.

Figures 4, 10:
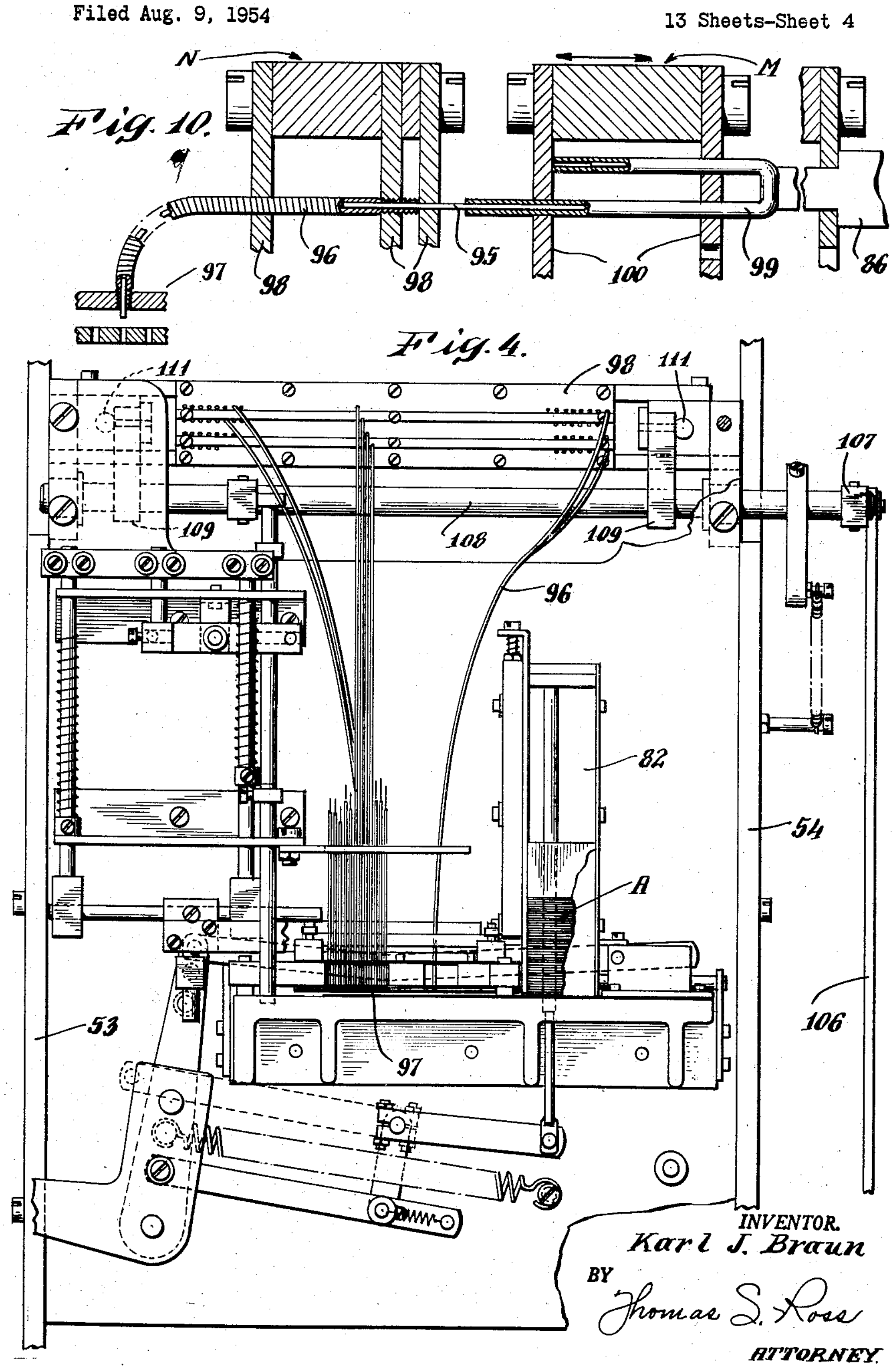
Fig. 4 is a front elevation of the tag feeding and reading or sensing unit of the machine with a number of the sensing wires broken away for the sake of clarity.

Fig. 10 is an enlarged sectional detail of one of the sensing wires and tubes including a portion of the oscillating unit M and the spring loaded pin for the wire shown.

Figures 10A, 10B:
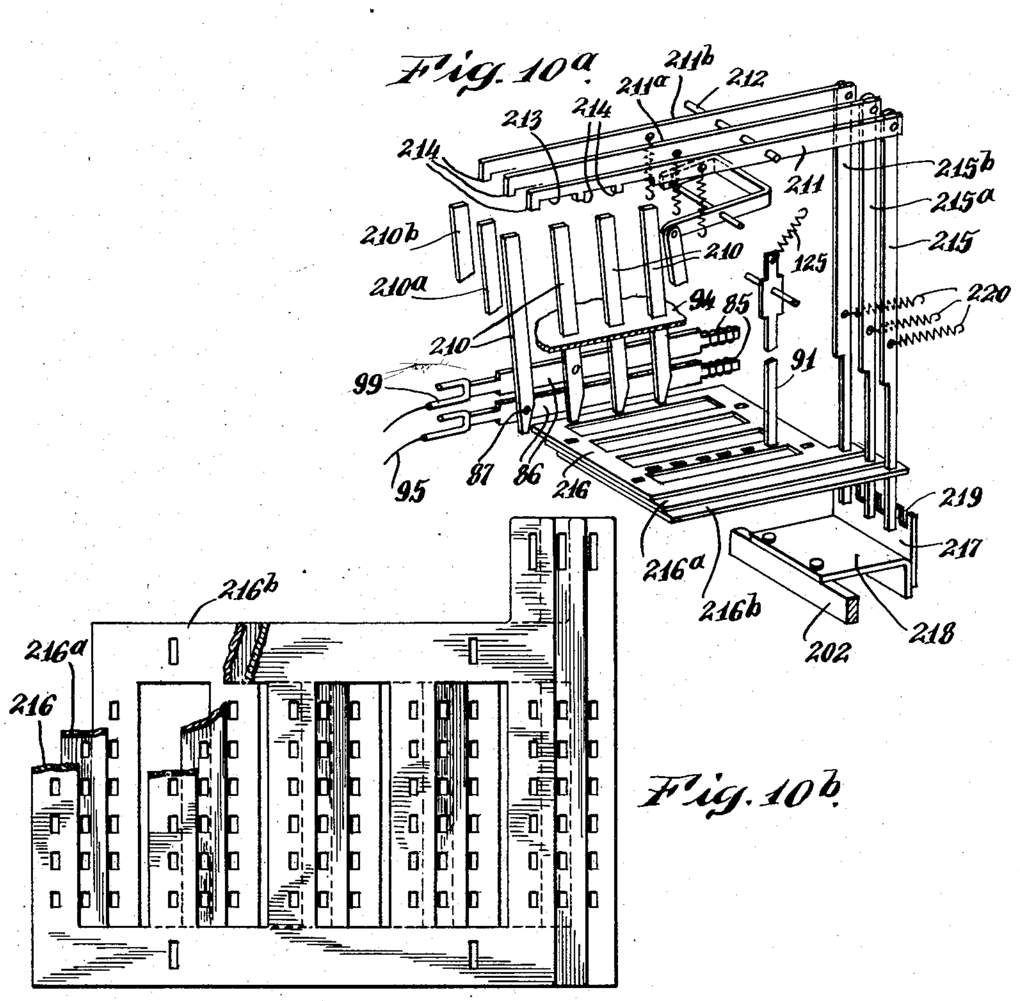

Fig. 10A is a fragmentary isometric view of the price and reprice controls.

Fig. 10B is a plan view of the price and reprice control slides to illustrate their staggered or off-set relation relative to one another.

Figures 11, 11A:
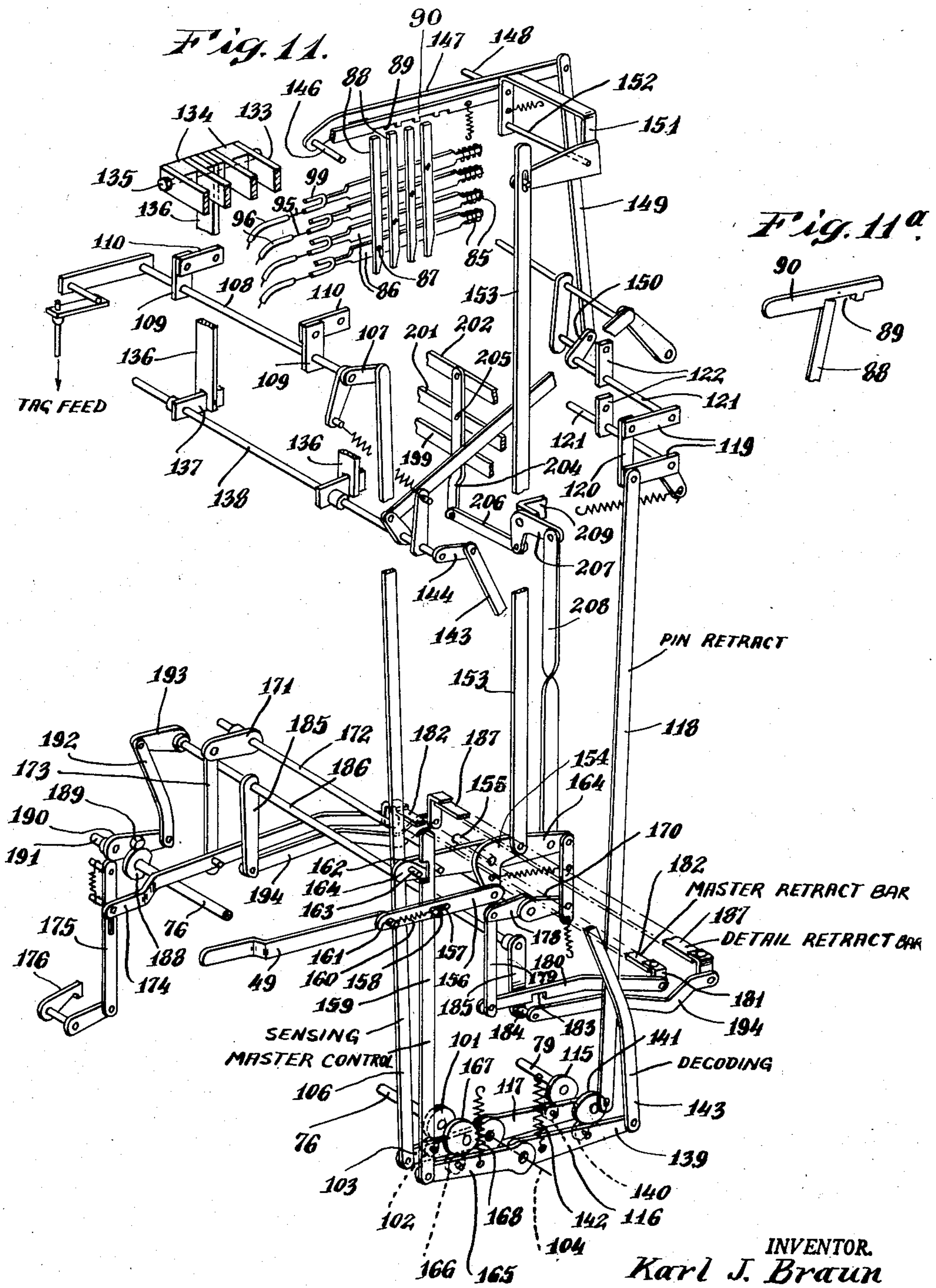

Fig. 11 is an isometric detail of the main controls of the machine including the detail to master shift mechanism, card-feed cut-out mechanism, and retract mechanism for wiping out all previous information set-up in the punch set bar baskets.

Fig. 11A is a detail showing the master latch conditioned for a master set-up.

Figure 11B:
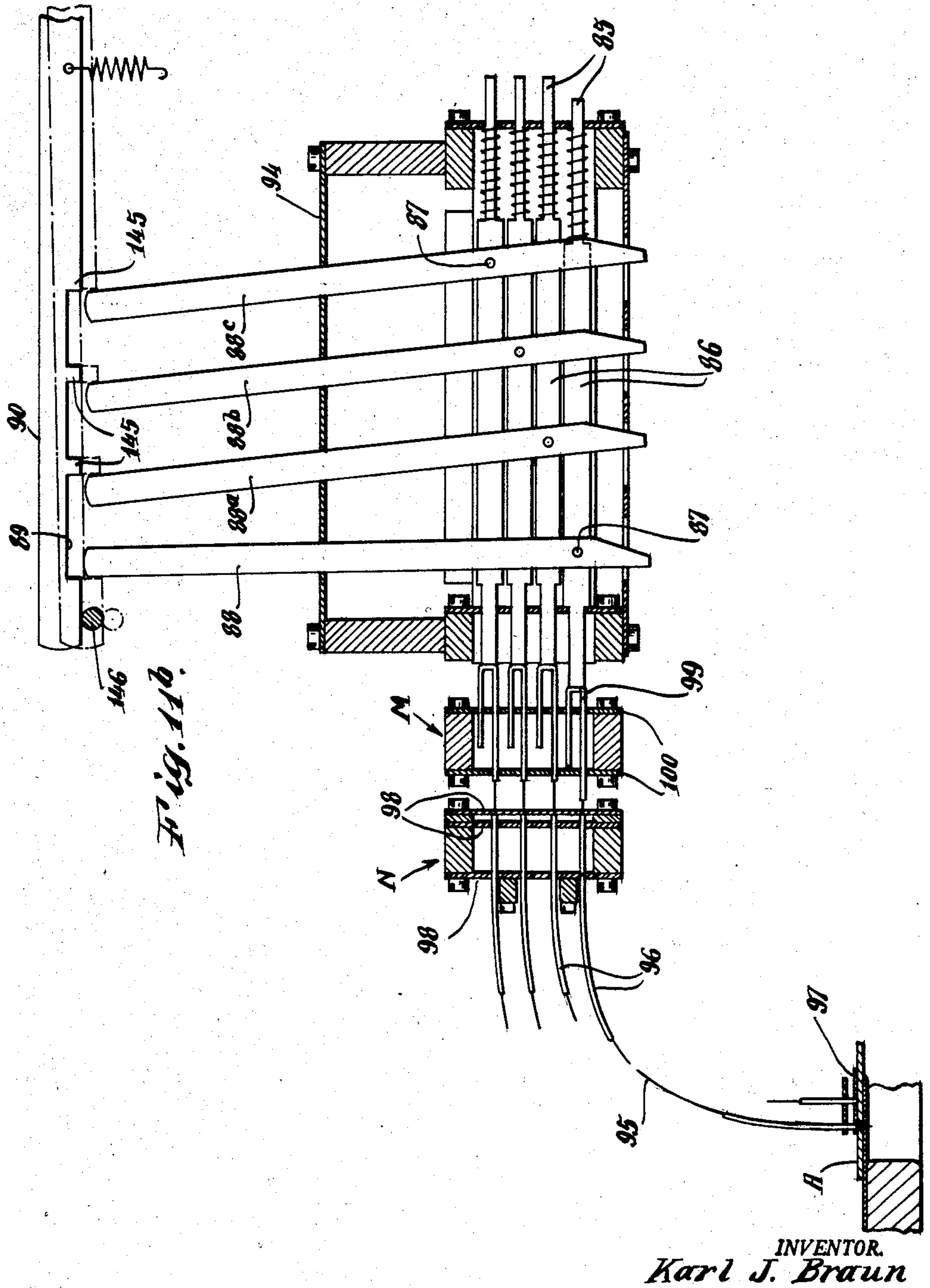

Fig. 11B is a side elevational detail illustrating certain control latches as they will appear when sensing a master tag.

Fig. 12 is an enlarged illustration of one of the tag stubs indicating the possible perforating positions in the various tag columns, the dotted lines indicating the various tag lengths.

Figure 13:
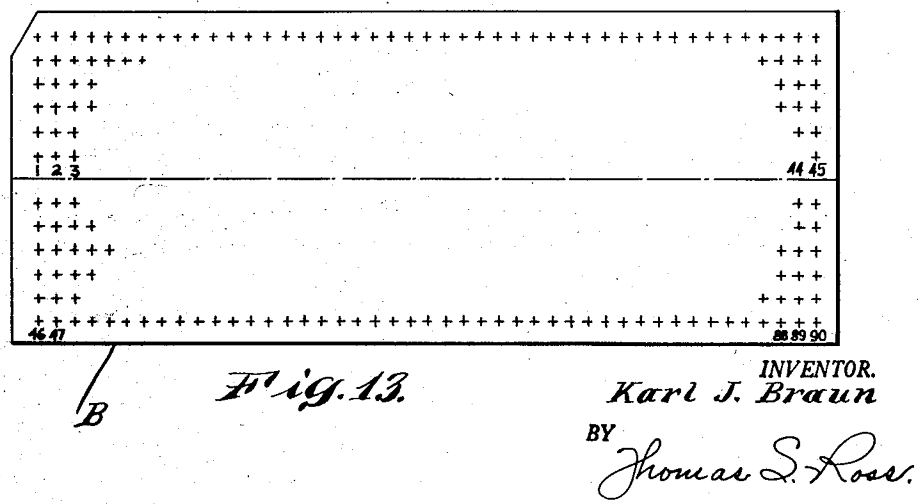

Fig. 13 is an illustration of a conventional tabulating card indicating possible perforating positions in plural fields for receiving "detail" information from detail tags and "master" information from master tags.

In order to more clearly understand the construction, arrangement, and operation of the improved record controlled record reproducing machine hereinafter disclosed, it is deemed advisable to start with a brief description of the "master" and "detail" tags as prepared on the tag-marking machine disclosed in the above mentioned Patent No. 2,708,873, and a brief description of a conventional tabulating card.

For this description attention is directed to Figs. 12 and 13. From Fig. 12 it will be clear that the upper portion of tag A contains a row of tag columns 1 to 12 inclusive, and the next row contains tag columns 13 to 14 inclusive. In the present disclosure column 21 has been selected as the control column to distinguish between master stubs and detail stubs. By punching the numeral "1," or any other desired digit or numeral in column 21 of the tag, the machine will be automatically conditioned to read the perforated information as "master" information, and in the absence of the punching of the selected numeral "1" in column 21, the machine is conditioned to read the perforated information as "detail" information. The mechine is normally set to read detail tags in a manner presently made clear.

The four rows in the lower portion of tag A represent the price and reprice columns and if desired, the spacing between these columns can be greater than between the designation columns 1 to 24 inclusive at the upper portion of the tag to permit printing between the columns in the manner illustrated in Fig. 12.

As shown herein the price and reprice columns of tag A are indicated as follows: Original or initial price, lower row contains tag columns 25 to 30 inclusive; first reprice, second row contains tag columns 31 to 36; second reprice, third row contains tag columns 37 to 42; and third, reprice, fourth row contains tag columns 43 to 48 inclusive.

From the example shown in Fig. 13 one field of card B may contain forty five columns of coded information with six possible perforating positions in each column, and the other field may contain forty five columns of coded information with six possible perforating positions in each column.

*Machine frame and covers*

Figure 1:
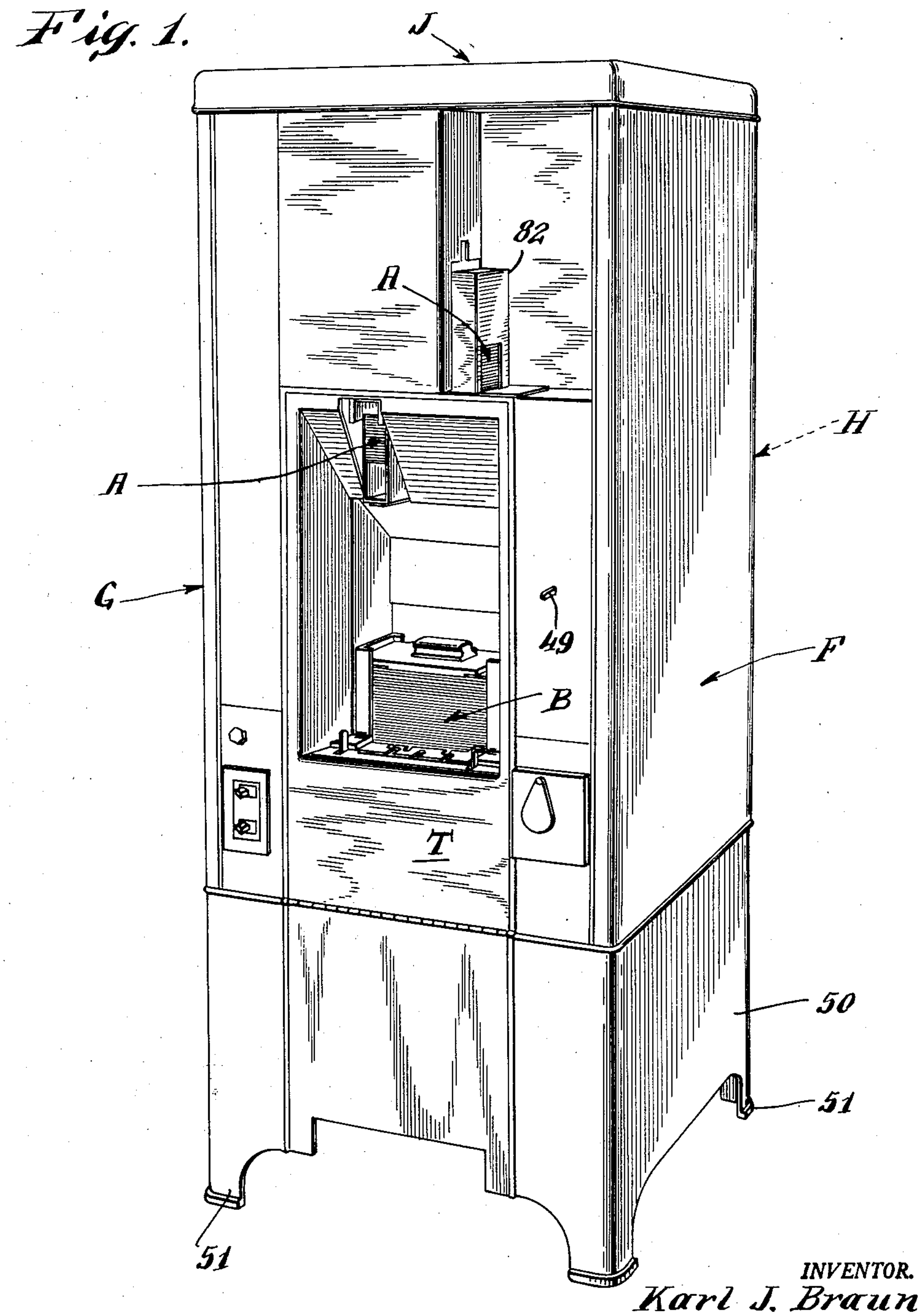
Fig. 1 is a perspective view looking toward the front and right side of the machine with all covers in place.
Figure 2:
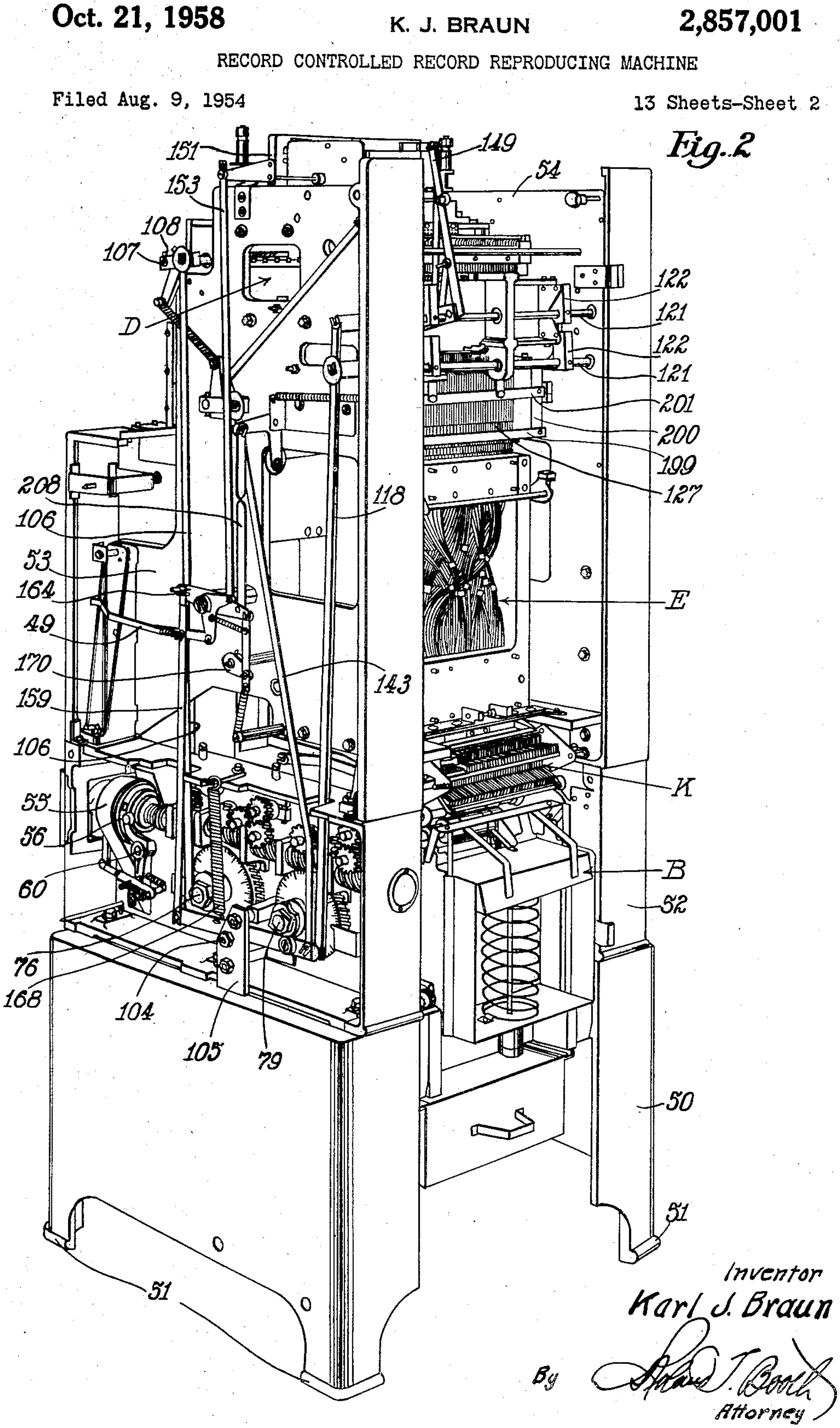
Fig. 2 is a perspective view looking toward the rear and right side of the machine with all covers removed.
Figure 3:
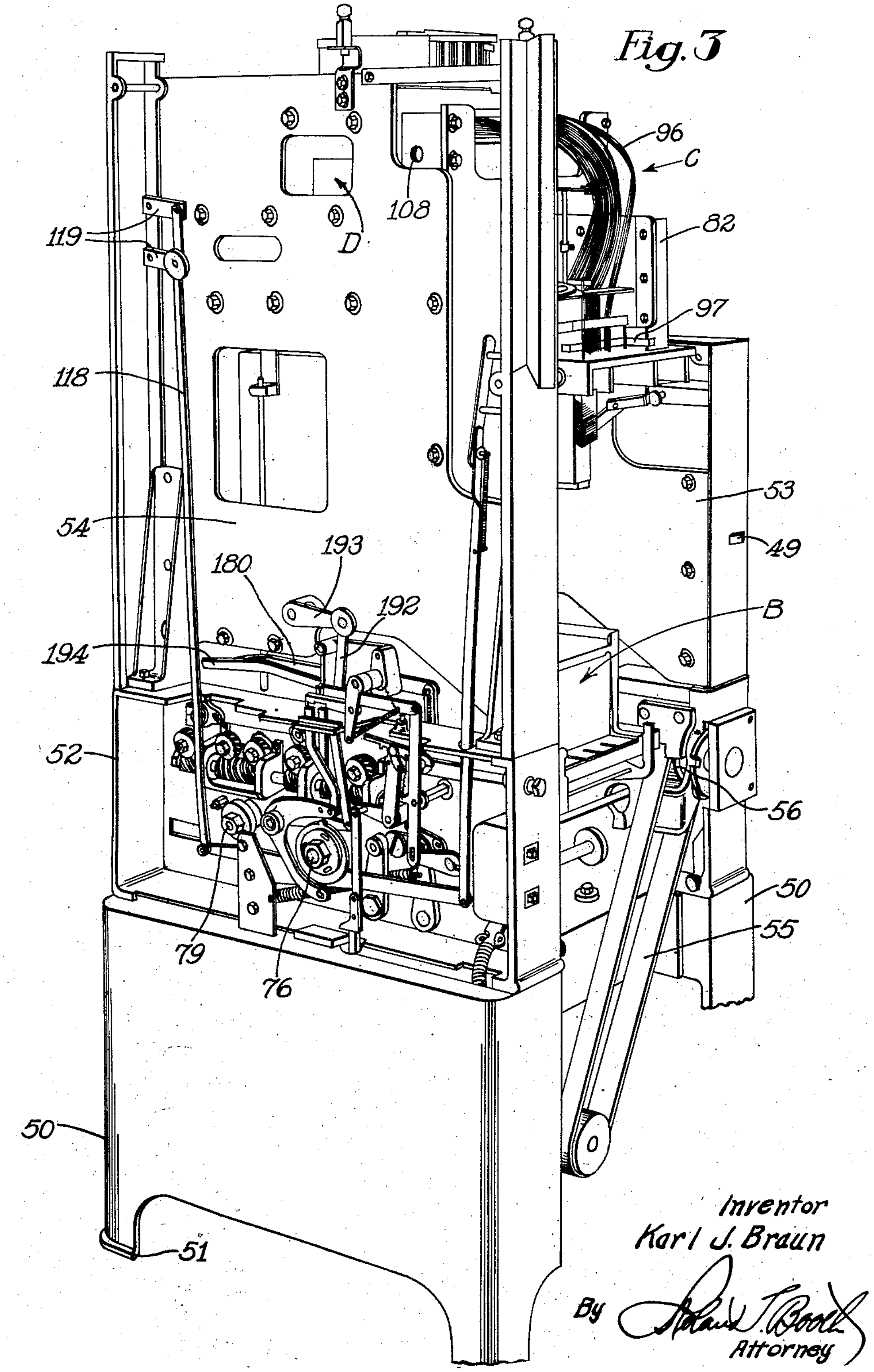
Fig. 3 is a perspective view looking toward the front and left side of the machine with all covers removed.

As will be seen from Figs. 2 and 3, the box-like base casting 50 of the present machine is similar to the base of a standard Powers tabulator and is provided with four legs 51. A second or intermediate casting or castings 52, securely mounted upon the top of base casting 50, supports the power-driven feed roll or conveyor system for the tabulating cards B in a manner substantially identical to that shown in the Patent 2,044,119 and it is not claimed as new herein. Spaced side plates or frames 53 and 54 respectively are securely mounted upon the top of castings 52 and these plates support the tag feed and sensing unit C, decoding and recoding unit D, flexible wiring unit E, and various control levers and other parts later described. The exterior of the machine above base casting 50 is closed by right and left-hand covers F and G, rear cover H, front cover T, and top cover J as clearly shown in Fig. 1.

*Power drive*

Figure 6:
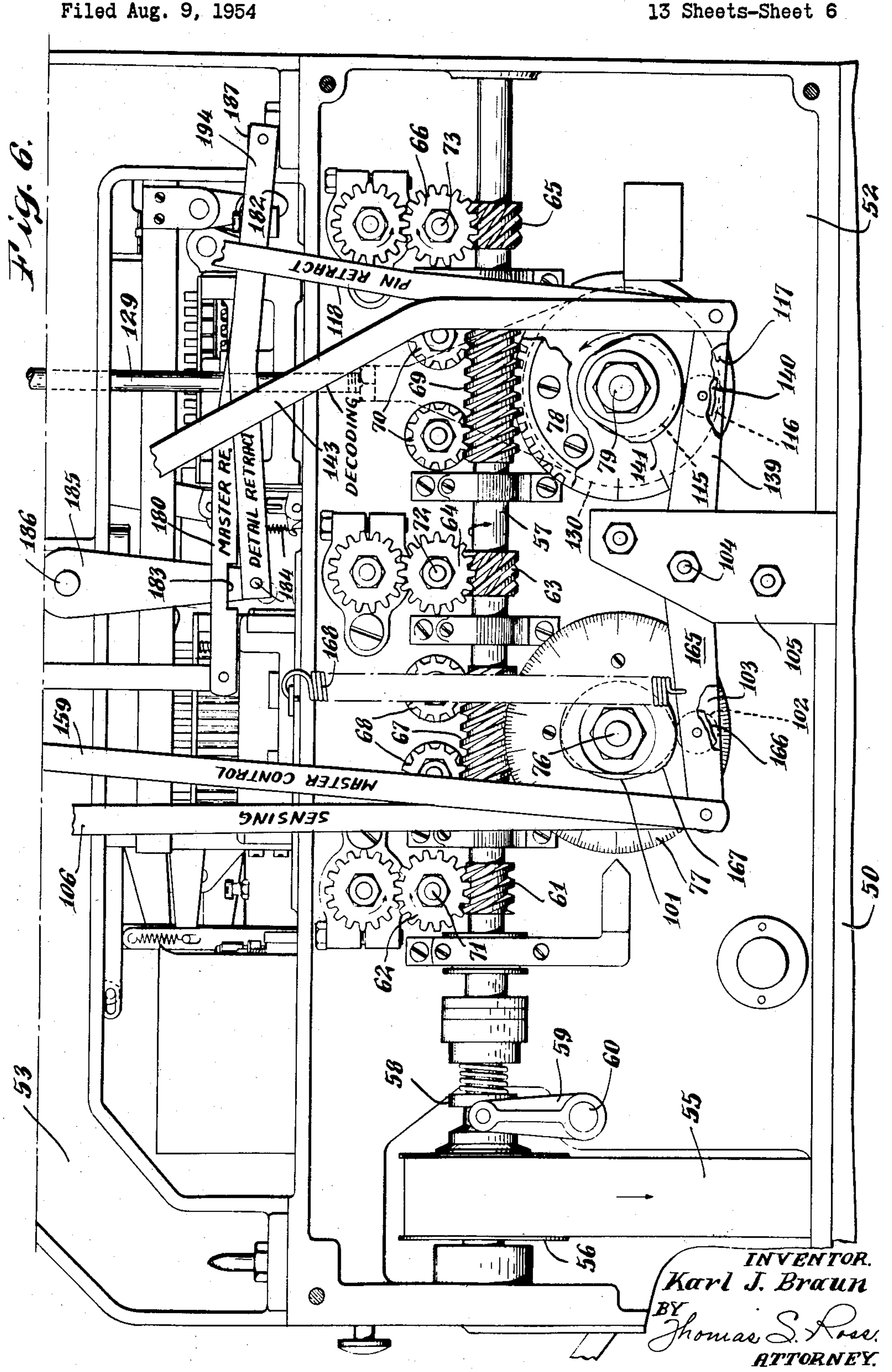
Fig. 6 is a fragmentary elevational view of the power drive gearing and control cams and levers as seen from the right-hand side of the machine with the covers removed.

With reference to Fig. 6, a belt 55, driven by a continuously running motor (not shown) turns a pulley 56. The pulley 56 is loosely mounted upon a shaft 57 which carries a spring pressed friction clutch member 58. The clutch member 58 is operated through an arm 59 (fast on a cross-shaft 60) by the usual toggle stop-start mechanism, shown in Fig. 7 which is old and well known in the art.

The shaft 57 (Fig. 6) carries a number of worm screws of which the worm 61 drives a gear 62; the worm 63 drives a gear 64; the worm 65 drives a gear 66; the worm 67 drives two gears 68; and the worm 69 drives two gears 70. The gears 62, 64, and 66 are fast respectively upon the righthand ends of shafts 71, 72 and 73. The shafts 71, 72, and 73 carry feed rolls, for conventional tabulating cards, and extend laterally across the machine. These shafts are geared (see Fig. 7) to worms held upon a shaft 74 supported by bearings 75 mounted upon the left-hand side of casting 52. As previously mentioned, the power-driven feed roll or conveyor system for the cards B is substantially identical to that shown in the Patent 2,044,119 and need not be fully described herein as it is well known in the art.

Figure 7:
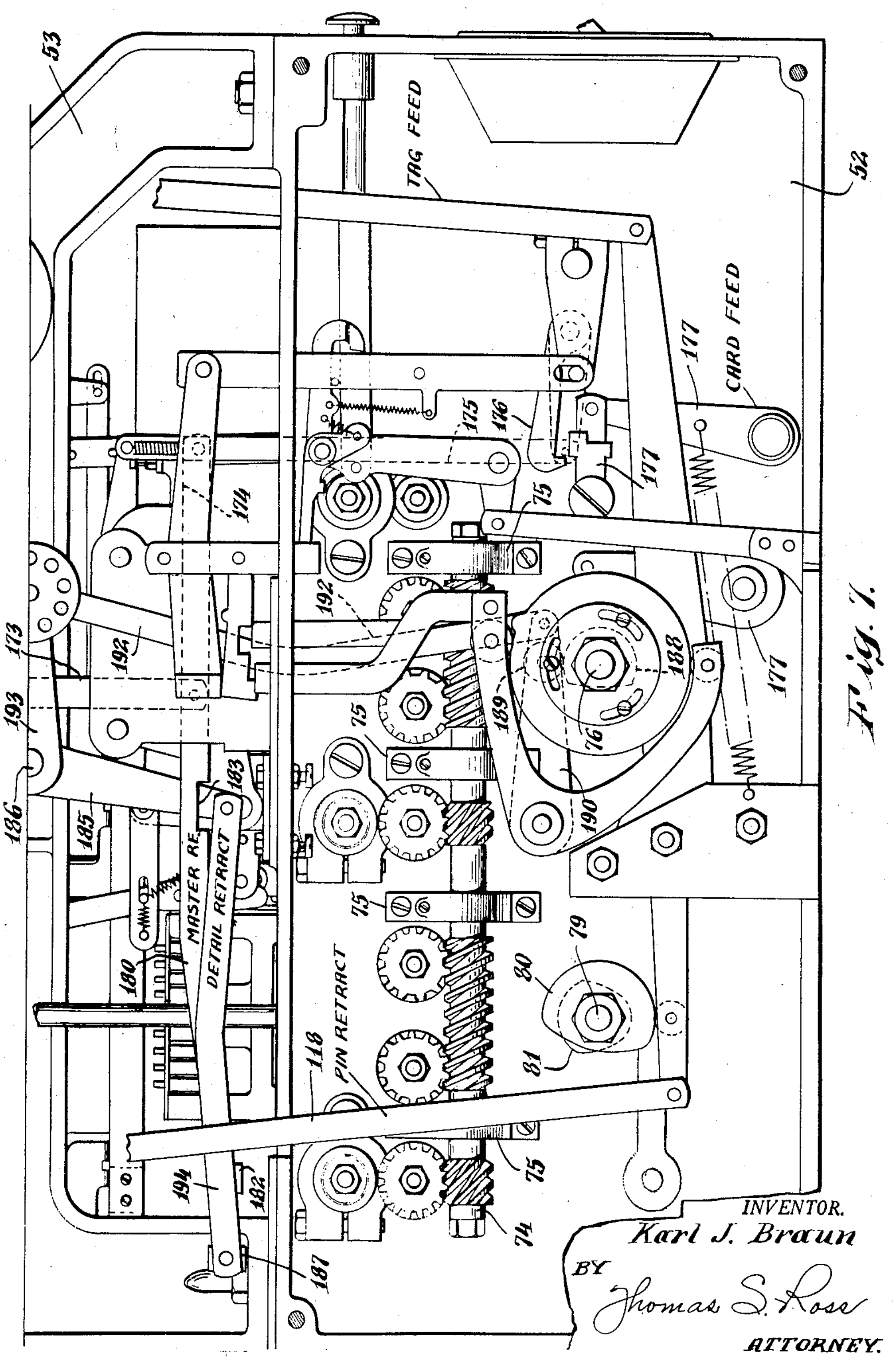
Fig. 7 is a fragmentary elevational view similar to Fig. 6 but viewed from the left side of the machine.

As seen in Figs. 6 and 7, a shaft 76 runs laterally across the machine and is positively driven by a gear on its right-hand end which meshes with the worm 67. This gear is not shown in Fig. 6 as it is covered by a dial 77. However the gear is the same as a gear 78 (Fig. 6) which meshes with and is driven by the worm 69 fast upon shaft 57. Dial 77 is used for the purpose of adjusting the timing of the machine in the conventional and well-known manner. The gear 78 is fast upon the right-hand end of a shaft 79 which extends laterally across the machine (parallel to shaft 67) and holds upon its left-hand end, two cams 80 and 81 (Fig. 7). The shafts 76 and 79 are suitably journaled in the side walls of casting 52. Shaft 76 is the main operating shaft of the machine and shaft 79 is the secondary operating shaft.

*Tag feeding and sensing mechanism*

Figure 5:
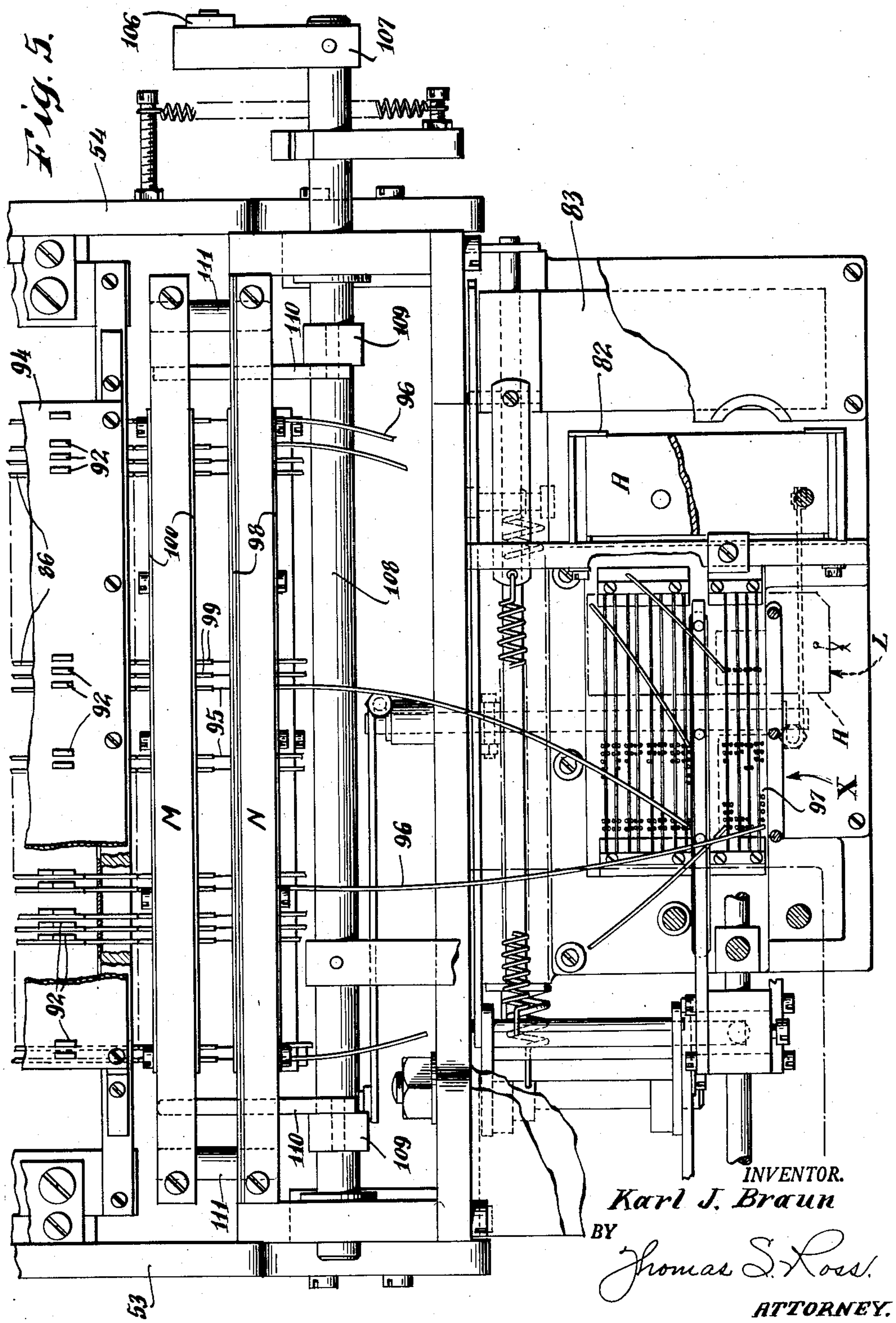
Fig. 5 is a top plan view of Fig. 4.

Referring particularly to Figs. 1, 4 and 5, the tags or stubs A to be fed into the machine are inserted into the tag feeding magazine 82 which is located on the upper front of the machine just to the right of center as shown in Fig. 1. The tags or stubs A are fed one at a time from the magazine 82 by a picker knife 83 (Fig. 5) as fully described in my above mentioned Patent No. 2,704,186. On the first machine cycle, a tag stub is fed partially out of the magazine 82 and on the next machine cycle it is fed by the pins 84 into a "control sensing position" (indicated by reference letter L in Fig. 5) beneath the row of four control sensing wires which register, in the present showing, with column 21 of the tag when the tag is in this control sensing position. In the event a tag A has the numeral "1" punched in column 21, the machine is signalled that a "master" tag or stub is being fed, and if the numeral "1" is not punched in column 21, the machine is signalled that a "detail" tag or stub is being fed.

When a master tag is fed to the control sensing position or station L, by the pins 84 and control code "1" perforation is sensed, a master cycle of the machine performs the following three functions. First, feed of the tabulating cards B is stopped, second, all previous information in the set-bar baskets K (Fig. 8) of the punching section is retracted or wiped out, and third, the master set-up pins 126 are shifted beneath the tumbler pins 91 of the decoding and recoding unit as shown in Fig. 9A which will later be more fully described.

As seen in Figs. 9, 9A and 11, when the master control sensing wire 95 in tube 96 passes through the hole for code "1" in column 21 of a master tag A (Fig. 12), spring 85 for the pin 86 causes the pin to move to the left as viewed in Figs. 9A and 11. This movement of pin 86, through its laterally projecting extrusion 87, rocks a latch 88 clockwise, in top plate 94, to permit the upper end of the latch to engage the forward notch 89 in arm 90, as clearly shown in Figs. 11A, and 11B to condition the machine for a "master" set-up. It should be noted at this point that the only time latch 88 can be engaged with notch 89 is when code "1" in column 21 is punched in the tag A. If any other coding is punched in column 21 and sensed either in combination with code "1" or not, arm 90 cannot be conditioned to be operated by latch 88 to set the machine for a master set-up. Whenever the feed mechanism fails to feed a tag A into control sensing position L, arm 90 cannot be conditioned to be operated by latch 88 to set the machine for a master set-up.

Before describing the mechanism for performing the three functions above referred to for a "master" set-up, it is deemed advisable to describe the sensing wires and their movements. As shown in Figs. 9, 9A and 10, each sensing wire unit includes a Bowden wire 95 which is slidably mounted in a tube 96. The lower end of tube 96 is fast within a horizontal plate 97, located directly above the tag path, and the upper end of said tube 96 is fast within three stationary plates 98 as best shown in Fig. 10. The upper end of each Bowden wire 95 is anchored within a U-shaped tube 99 which is slidably mounted within a pair of plates 100 forming part of an oscillating unit M. As heretofore mentioned, the power for moving the Bowden wires against or through the holes in the tags is supplied by the spring loaded pins 86, and the power to restore the wires 95 is supplied by the forward plate 100 which is moved horizontally from the main operating shaft 76 by the following mechanism which will now be described with reference to Figs. 6 and 11.

Cam 101, fast on main operating shaft 76, cooperates with a roller 102 rotatably mounted on lever 103 which lever is pivoted upon shaft 104 mounted in a bracket 105 supported by the base casting 50. Sensing link 106 has its lower end pivotally connected to the forward end of lever 103 and its upper end pivotally connected to an arm 107 fast on the right hand end of horizontal shaft 108. The shaft 108 is suitably journaled in the side frames or plates 53—54. Also fast on shaft 108 is a pair of arms 109 which are connected to the oscillating unit M, including the plates 100, by short links 110. It will now be clear from Figs. 5, 6 and 11 that upon rotation of main operating shaft 76, cam 101 will drive roller 102 downwardly which in turn rocks lever 103 counterclockwise upon pivot shaft 104. This draws the sensing link 106 downwardly causing arm 107 to rock shaft 108 clockwise, as viewed in Fig. 11, when restoring the oscillating unit M to normal position, which is the position illustrated in Fig. 5. The timing of cam 101 is such that oscillating unit M is moved toward the stationary unit N (which includes the plates 98) during a sensing operation of the tags A, and from unit N when restoring the Bowden sensing wires 95. Parallel movement between oscillating unit M and stationary unit N is conveniently obtained through a pair of pins 111 carried by unit M and slidable within holes in unit N as clearly shown in Figs. 4 and 5.

*Decoding and recoding unit*

As above mentioned the four spring loaded pins 86 (Figs. 9A and 10) for each sensing wire 95, control four latches 92 pivoted at their upper ends within top plate 94 and these latches are engaged by extrusions 87 projecting from the four corresponding pins 86. The latches 92 control four-decoding slides 112 in the decoding and recoding unit D. Through the various possible combinations or set-ups in the punching of the tags A, it will be understood that the four decoding slides 112 in the latched or unlatched position will control the horizontal movement of the ten set-up pins 113 as viewed in Fig. 9A, to effect a combination designated as zero to nine. Each vertical row of ten set-up pins 113 are in vertical alignment with ten corresponding recoding or translating pins 114, and the latter pins are restored by a plate 115 positively driven, by a linkage and cam arrangement from main operating shaft 76, in a manner now described. Referring again to Figs. 6 and 11, cam 315, fast on the secondary operating shaft 79 cooperates with a roller 116 mounted near the rear end of a lever 117 to drive the lever down during an operating cycle of the machine. This downward movement of lever 117 in turn draws the sensing pin retract link 118 downwardly, and through arms 119 and short link 120, rocks a pair of transverse shafts 121 suitably journalled in side plates 53—54 counterclockwise, as viewed in Fig. 11. This counterclockwise rocking movement of shafts 121 (through arms 122 fast on said shafts and pivotally connected at 123 to ears **115*a* formed on plate 115) moves the plate against the right-hand end of all recoding pins 114 when restoring said pins 113 and 114 and tensioning springs 124**.

When plate 115 is moved to the right (Fig. 9A) springs 124 on pins 113, urge all pins 113—114 (not blocked by the decoding slides 112) to the right, and when plate 115 is moved to the left all of the pins 113—114 are restored to the position illustrated in Fig. 9A. Whenever any of the set-up pins 113 are permitted to move to the right (under control of the decoding slides 112), their corresponding tumbler pins 91 are urged to the right, tensioning springs 125, and aligning the bottom ends of the set tumbler pins with either the master pins 126 or detail pins 127 in a manner presently made clear. After the selected tumbler pins 91 are aligned with the master or detail pins, as the case may be, the tumbler pin unit as a whole is then moved downwardly through links 128 and rods 129 driven by eccentrics 130 (Figs. 6 and 9A) fast on secondary operating shaft 79.

This downward movement of the tumbler pins causes all of the set tumbler pins 91 to depress their corresponding master pins 126 or detail pins 127, depending upon which of the pins 127 are positioned beneath the tumbler pins, as will presently appear. Depression of the master or detail pins in turn, through the use of a conventional flexible wire unit E, sets-up the information to be punched into the tabulating cards B in the conventional set-bar baskets indicated generally at K (Fig. 8) for operating the card punches 131 in the usual and well known manner.

It should be noted here that after plate 115 restores both sets of pins 113—114 to the left as shown in Fig. 9A, all decoding slides 112 will be positively driven in a downward direction to their lower normal position by the four transverse bars 133 thus tensioning the springs 132. The means for vertically moving the four bars 133 will now be described with reference to Figs. 9A and 11. The bars 133 are spaced in parallel relation relative to one another by suitable spacers 134 inserted between their ends and the bars and spacers are united by bolts 135. The upper end of each link 136 has a hole to receive its respective bolt 135 and the lower end of each link is pivotally connected to an arm 137 which is fixed to the transverse shaft 138, said shaft being suitably journalled in the side plate 53—54. Rocking movement is imparted to shaft 138 during each machine cycle by the following mechanism. Arm 139 pivoted upon shaft 104, carries a roller 140 which cooperates with a cam 141 (Figs. 6 and 11) fast on the secondary shaft 79 to drive arm 139 downwardly against the tension of spring 142. The lower end of decoding link 143 is pivotally connected to the free end of arm 139 (Fig. 11), while the upper end of said link is pivotally connected to the rearward end of an arm 144 fast on the right hand end of transverse shaft 138.

It will now be understood that during every machine cycle, cam 141 will be given one revolution to drive arm 139 downwardly and the arm in turn drives link 143 downwardly thereby rocking shaft 138 clockwise (Fig. 11), and through links 136, the bars 133 and decoding slides 112 are also driven downwardly to their normal lowered position against the tension of springs 132. In other words, during each cycle of the machine the four bars 133 will be elevated and lowered to release and subsequently restore the decoding slides 112 by power derived through the cam 141 and spring 142 as above described.

All of the latches 92 controlling all of the decoding slides 112 will have the lower ends moved to the left as shown in Fig. 9A into alignment with the upper ends of bars 112 retaining them in position to retain all set-up pins 113 in the left-hand position shown in Fig. 9A against movement by springs 124. None of the tumbler pins 91 are operated. As a result, no information is set up in the tumbler pin unit. There is also no operation of the detail pins 127 and no transfer of information to set bar baskets K.

*Master cycle of the machine*

As previously mentioned, when a master stub is fed from the magazine 82 to the control sensing position L, by picker knife 83 and pins 84, and the numeral "1" in column 21 of the tag is sensed, the machine is set for a "master cycle" which cycle conditions the machine for (1) stopping the feed of tabulating cards B, (2) retract or wipe out all information previously set-up in the set-bar baskets K, and (3) initiate a shift of the master set-up pins 126 to shift them into the same vertical plane as the tumbler pins 91 and remove the detail set-up pins 127 from the vertical plane occupied by said tumbler pins 91.

Referring now to Fig. 11B, the sensing wire 95 is shown as it will appear when sensing the number "1" code in column 21 of a master tag A. It will be noted from Fig. 11B that oscillating unit M has moved forward toward stationary unit N allowing spring 85 to shift pin 86 forwardly, or to the left, causing tube 99 to follow the movement of unit M thus passing sensing wire 95 thru the code "1" hole in master tag A. This leftward movement of pin 86, through its extrusion 87, rocks latch 88 clockwise in top plate 94 to align the upper end of said latch 88 with notch 89 in arm 90.

As code "1" is the only hole punched in column 21 of any master tag A the sensing wires 95 for the three remaining latches 88a, 88b and 88c will not be permitted to move thru the tag and consequently their respective pins 86 will not rock the latches 88a, 88b and 88c clockwise beneath blocking surfaces 145 of arm 90. With the four latches 88, 88a, 88b, and 88c in the position shown in Fig. 11B, arm 90 is free to move to the dotted line position when pin 146 on lever 147 (Fig. 11) is lowered. Pin 146 is lowered and raised during every machine cycle as will now be explained in connection with Fig. 11. Lever 147, pivoted upon shaft 148, has its rearward end pivotally connected to the upper end of link 149. The lower end of link 149 is pivotally connected to the free end of an arm 150 fast on the upper shaft 121 previously referred to as rocked by cam 115 through the linkage 117—118—119 and 120 respectively as shown in Fig. 11.

If the feed mechanism fails to feed a tag, all of the sensing wires 95 for latches 88, 88a, 88b and 88c will be moved to the left by pins 86 as shown in Figs. 11 and 11B. This locates the upper ends of latches 88a, 88b, and 88c out of alignment with the notches in bar 90 so they will engage the lower ends of blocking surfaces 145 on arm 90 and prevent lowering of the arm. The machine cannot be conditioned for a master set-up when no tag is fed into the control sensing position L.

Assume now that arm 90 has been lowered to the dotted line position of Fig. 11B to engage its forward notch 89 with the top of latch 88. As oscillating unit M is restored or moved to the right by the cam 101 and linkage previously described, the forward plate 100 of unit M moves tube 99 to the right. This withdraws the master sensing wire 95 from the code "1" perforation in tag A and restores pin 86 and its associated latch 88. Restoration of latch 88 (or counter-clockwise rocking movement thereof as viewed in Figs. 11 and 11B) shifts arm 90 forwardly or to the left as indicated by the arrow which in turn rocks the bell crank 151 counterclockwise upon a shaft 152 suitably supported in the machine. Counterclockwise movement of bell crank 151 in turn drives link 153 downwardly to rock bell-crank 154 clockwise about its pivot pin 155 to move link 156 to the left. Link 156 is provided with an elongated slot 157 to receive pin 158 projecting from the master control link 159 and a spring 160, having one end attached to pin 158 and its other end anchored to a pin 161 carried at the forward end of link 156, serves as a yield between the links 156 and 159 respectively. The upper end of link 159 has a notch 162 that cooperates with a pin 163 which projects sidewardly from the forward end of an arm 164 pivoted upon the pivot pin 155. The lower end of master control link 159 is pivotally connected to the forward end of arm 165 which carries a roller 166 and is pivoted upon shaft 104. For every machine cycle, arm 165 is driven downwardly, or moved counterclockwise about the shaft 104 by a cam 167 fast on main operating shaft 76 and engaged with roller 166. The arm 165 is restored by a spring 168 connected between the arm and a pin projecting from the base casting 50. From the foregoing description it will now be clear that link 159 is moved up and then down during every machine cycle, and that its notch 162 will only be engaged with pin 163 upon forward movement of link 156 as above described.

When a master stub is fed and sensed at the control sensing position L, link 156 is then caused to move forwardly (or to the left in Fig. 11) as just described to engage notch 162 with pin 163 so that upon the next downward travel of link 159 arm 164 will be rocked counterclockwise about pivot pin 155. This counterclockwise rocking movement of arm 164 furnishes the power for stopping the feed of cards B, wiping out the set-up in the set-bar baskets K, and shifting the master and detail set-up pins beneath the tumbler pins as previously mentioned.

Stopping the feed of tabulating cards B is accomplished by the following mechanism. When arm 164 is rocked counterclockwise upon its shaft 155, link 169, pivotally connected to the rearward end of said arm 164, is driven upwardly thereby rocking arms 170 and 171, fast on shaft 172, counterclockwise to drive links 173—174 and 175 downwardly to position the latch 176 for blocking and disabling the conventional card feed mechanism parts of which are indicated by reference numeral 177 in Fig. 7.

Figure 8:
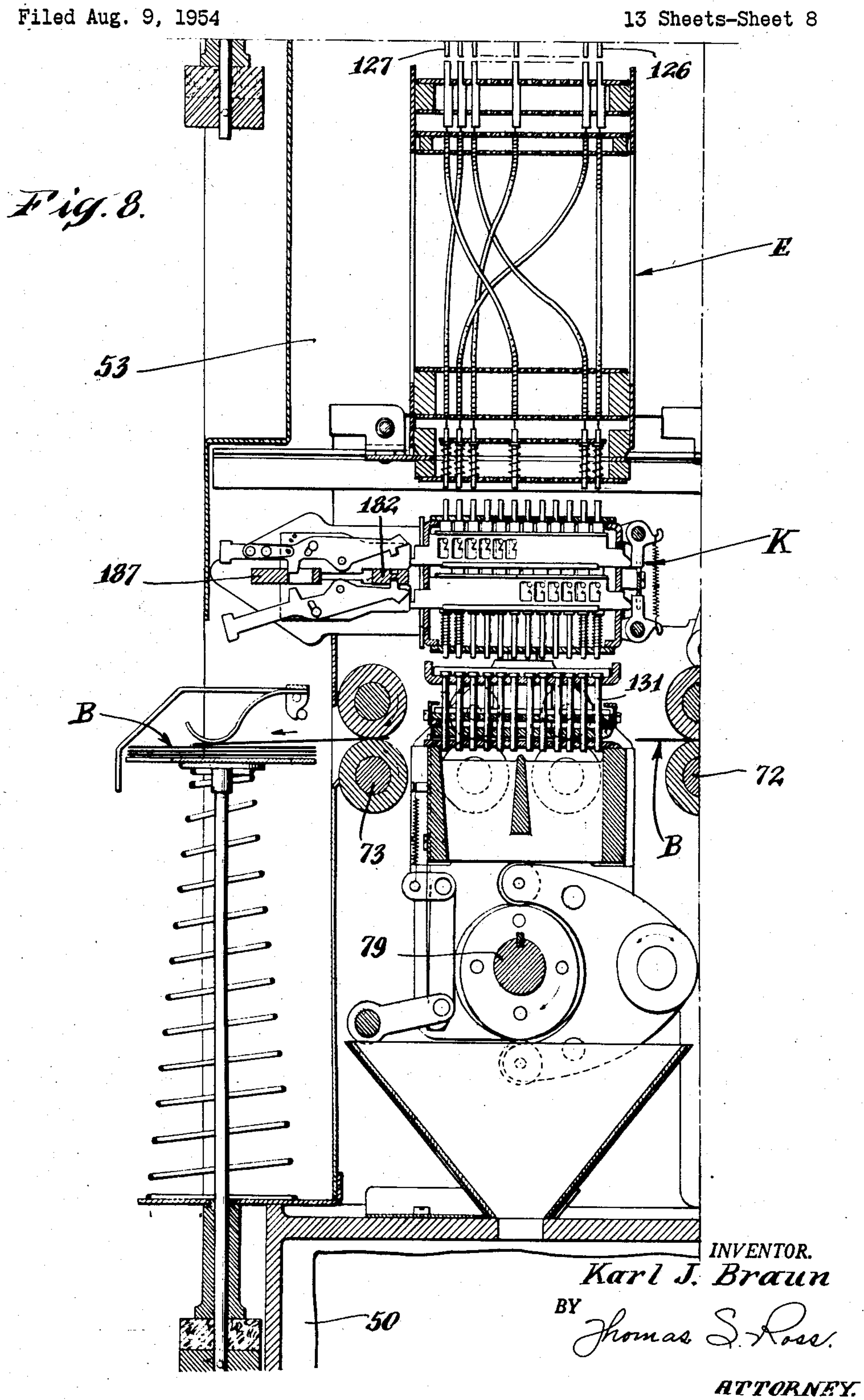
Fig. 8 is a vertical section, as seen from the left-hand side of the machine, taken substantially through the center of the flexible wiring unit, set-bar baskets and card punching and feeding mechanisms.

For a description of the mechanism for retracting or wiping out all previous information set-up in the set-bar baskets K, when a master tag A is sensed, attention is directed particularly to Figs. 8 and 11. It will be recalled that upon sensing a master tag A, arm 164 is caused to rock counterclockwise. This movement of arm 164 is utilized to impart a counterclockwise rocking motion to shaft 172 as previously explained. Projecting forwardly from the right-hand end of shaft 172, and fast thereon, is an arm 178 to which the upper end of link 179 is pivotally attached. The lower end of link 179 is pivotally connected to the forward end of a substantially horizontal link 180 and the rear end of said link 180 is pivotally connected through an L-shaped bracket 181 to the right-hand end of the conventional master restoring bar 182 for the set-bar basket K. Horizontal link 180 is provided with a notch 183 on its lower edge (Fig. 11) which cooperates with a pin 184, projecting laterally from the lower end of arm 185 fast on transverse shaft 186, when the link 180 is lowered by counterclockwise movement of arm 164 through the above described linkages and shafts 169, 170, 172, 178 and 179 respectively.

It should be explained at this point that during every cycle of the machine the detail restoring or retract bar 187 is oscillated to wipe-out all detail information that is set-up in the set-bar basket K by the following mechanism. A cam 188, fast on the left-hand end of main operating shaft 76, drives a roller 189 carried by an arm 190 pivoted upon a shaft 191 mounted in base casting 50, to rock the arm counterclockwise (Fig. 11) which in turn raises link 192 to rock arm 193 and shaft 186 clockwise. This clockwise rotation of shaft 186 in turn swings the levers 185 clockwise, and through links 194, oscillates the detail restoring bar 187.

From the foregoing it will now be understood that whenever link 180 is lowered, upon sensing a master tag A, to engage its notch 183 with pin 184, both master and detail restoring bars 182 and 187 will be oscillated to wipe out all master and all detail information previously set-up in the set-bar baskets K. It will be further understood that all detail information set-up in the set-bar basket K, by the detail tags A, is wiped out at the end of each machine cycle and that master information set-up in the set-bar basket K, by a master tag A, is only wiped out when a new master tag is fed.

The third function performed by the machine, when a master tag A is fed and sensed at the control sensing position L, is the automatic allocation of data from two tags or stubs to one tabulating card or the like. This is accomplished by shifting the master and detail set-up pins 126—127 beneath the tumbler pins 91. The detail set-up pins 127 (Fig. 9A) are normally in the same vertical plane as the tumbler pins 91 and when a master tag A is fed from the magazine 82 the detail set-up pins 127 are shifted out of the vertical plane with respect to the tumbler pins 91 and the master set-up pins 126 are shifted or brought into the same vertical plane as the tumbler pins 91.

Referring particularly to Figs. 9A and 11, the operating means for shifting the master and detail set-up pins beneath the tumbler pins, will now be described. This mechanism, as heretofore explained, receives its power from the counterclockwise rocking of arm 164 upon engagement of master control link 159 with said arm. As best shown in Fig. 9A, the master and detail set-up pins 126—127 are mounted for vertical sliding movement within a lower stationary plate 195 and an upper movable plate 196. Springs 197, encircling the reduced lower ends of the set-up pins 126—127, serve to normally hold the pins in their elevated position with the steps 198 of the pins resting against the underside of plate 196 as shown in Fig. 9A. The lower stationary plate 195 is suitably secured to the lower transverse cross-bars 199 and the ends of these bars are secured to end castings 200 which are conveniently bolted to the side plates 53—54 respectively. The ends of intermediate transverse cross-bars 201 are also securely attached to the end castings 200 and the top pair of transverse cross-bars 202, which carries the top movable plate 196, is supported by a plurality of short links 203 the ends of which are pivotally connected to the bars 201 and 202 respectively as clearly shown in Fig. 9A.

It will now be seen that short links 203 permit the top pair of bars 202 and top plate 196 to move horizontally between the end castings 200 to effect a shift of either the master set-up pins 126 or detail set-up pins 127 into the same vertical plane as that occupied by the tumbler pins 91. The means for shifting the top plate laterally within the machine comprises a lever 204 pivoted intermediate its ends at 205 to the forward cross-bar 201 and at its upper end to the forward cross-bar 202. The lower end of lever 204 is connected to the rearward end of pivoted arm 164 through a link 206, bellcrank 207 and vertical link 208 as best shown in Fig. 11. The bellcrank 207 is pivotally supported by a bracket 209 suitably secured to the right-hand side plate 54.

It will now be apparent that whenever arm 164 is rocked counterclockwise by a "master shift" cycle, as above explained, top plate 196 will be shifted laterally of the machine through the bars 202 and linkage 204, 206, 207, 208 respectively to remove the detail set-up pins 127 from cooperative relation beneath the tumbler pins 91 and shift the master set-up pins into cooperative relation beneath said tumbler pins 91.

*Price and reprice mechanism*

Mention has already been made of the fact that the present machine has provisions for automatically selecting and reading the latest price punched in the detail tags A when sensing detail tags and reading or sensing all prices punched in the master tags A when sensing master tags. This is accomplished in the present machine by the following mechanism, attention being directed particularly to Figs. 9A, 10A and 10B.

As shown in Fig. 10A three rows of latches indicated by reference numerals **210, 210*a* and 210*b* with four latches in each row, are disposed, in the present embodiment, adjacent the four latches 88, 88*a*, 88*b* and 88*c* for the "master control" previously described. When the original price (Fig. 12), columns 25 to 30 is the only price punched in a "detail" tag A none of the latches are operated since no perforations appear in columns 31 to 48 respectively, and this original price is therefore set-up in the set-bar basket K in the same manner as information punched in columns 1 to 24 exclusive of control column 21. The row of latches 210 are actuated to block the tumbler pins 91 for the original price (columns 25 to 30 inclusive) whenever anything is punched in the units column 36 of the reprice section (columns 31 to 36 inclusive). Similarly, the row of latches 210*a* are actuated to block the tumbler pins 91 for the original price (columns 25 to 30) and reprice (columns 31 to 36) whenever anything is punched in the units column 42 of the 2nd reprice section (columns 37 to 42) and finally, the third row of latches 210*b* are actuated to block the tumbler pins 91 for the original price, reprice and second reprice (columns 25 to 42 inclusive) whenever anything is punched in the units column 48** of the 3rd reprice section (columns 43 to 48). The mechanism for accomplishing this price selection for detail tags A will now be explained in detail.

As shown in Fig. 10A three levers 211, **211*a* and 211*b*, pivoted midway their ends upon shaft 212, are in vertical alignment with the three rows of latches 210, 210*a* and 210*b* respectively. Each of the levers 211, 211*a* and 211*b* are provided with a plurality of notches 213 and blocking surfaces 214 for cooperation with the upper ends of latches 210, 210*a* and 210*b* in a manner and for reasons soon to be described. Three vertical links 215, 215*a* and 215*b* are pivotally connected at their upper end to the rear ends of levers 211, 211*a* and 211*b* respectively, and their lower ends are received by slots in three off-set plates 216, 216*a* and 216*b* as clearly illustrated in Figs. 10A and 10B. The three plates 216, 216*a* and 216*b*** are substantially identical to one another but are staggered or off-set as shown in Fig. 10B for reasons presently explained.

It should be noted at this time that whenever the levers 211, **211*a* and 211*b* are permitted to rock counterclockwise on shaft 212 that the lower ends of links 215, 215*a* and 215*b* will be lifted clear of the comb 217 which is mounted upon a bracket 218 fastened to and movable with the rearward bar 202** of the master and detail shift mechanism heretofore described.

Referring now to Fig. 12 as an example, let it be assumed that the original price punched in detail tag A is $3.27; and that this particular detail tag is also punched with a "reprice" of $3.19; a second reprice of $2.98 and a third reprice of $1.79. When sensing a detail tag punched in this manner only the third reprice of $1.79 will be sensed or read as detail information, and set up in the set-bar basket K, and the other prices, namely, $2.98, $3.19 and $3.27 will be suppressed or blocked out by the slides 216, **216*a* and 216*b* respectively. The construction of the slides 216, 216*a* and 216*b* and their operation through the levers 215, 215*a* and 215*b* is such that slide 216 blocks out the original price punched in columns 25 to 30 when anything is punched in the reprice field column 36; slides 216 and 216*a* block out the original price and reprice whenever anything is punched in the second reprice field column 42; and slides 216, 216*a* and 216*b* block out the original price, reprice, and second reprice whenever anything is punched in the third reprice field, columns 48. This is accomplished by the fact that latches 210, 210*a* and 210*b* are beneath the blocking surfaces 214 thus holding the levers 211, 211*a* and 211*b* in their elevated position and the lower ends of links 215, 215*a* and 215*b* blocked by the comb 217** as will be clear from Fig. 10A.

It will now be understood that whenever the machine is set for "detail" information, comb 217 will block levers 215, **215*a* and 215*b*** except the one that is elevated above the comb under control of the latest price punched in the detail tag being sensed.

Consider now that a "master" tag A, having all four price fields punched as illustrated in Fig. 12, is the one being fed and sensed. Under this condition, bar 202, carrying the comb 217, shifts laterally (or to the left in Fig. 10A) during a master shift as above described. This aligns the three notches 219 in the comb with the lower ends of levers 215, **215*a* and 215*b* respectively permitting all of the levers and their associated slides 216, 216*a* and 216*b* to be moved by the springs 220 and in so doing allows the actuated tumbler pins 91 to be moved into vertical alignment with their respective master set-up pins 126** thereby entering all four prices or the punchings contained in columns 25 to 48 inclusive into the set-bar basket K for punching into the tabulating card.

All of the latches 210, **210*a* and 210*b* will be moved in a clockwise direction, as shown in Fig. 10A, whenever the feed mechanism fails to feed a card into the information sensing station, as well as the control sensing station, so the upper ends will engage blocking surfaces 214. This will hold levers 211, 211*a* and 211*b*** in elevated position so that no operation of the other mechanism controlled thereby will occur and no information will be transmitted to set bar baskets K.

Provision is also made in the present machine to automatically stop the machine drive in the event the tag or card magazines become empty, but since this mechanism, or its equivalent, is well known in the art and not claimed herein no description is believed necessary.

*Operation*

To prepare the machine for use, a supply of blank tabulating cards B is placed in the card magazine at the front of the machine as shown in Fig. 1 and a supply of master tags A, interspersed with their corresponding detail tags, are placed in the tag feeding magazine 82 also shown in Fig. 1. The motor of the machine is then started to rotate the main and secondary operating shafts 76 and 79 respectively.

Assuming the first tag fed from the bottom of the tag magazine 82 to control station L is a master tag, this will automatically condition the machine for a master cycle by stopping the feed of tabulating cards, wiping out any previous set-up in the set-bar baskets K and shifting the master set-up pins 126 into cooperative relation with the tumbler pins 91 while simultaneously shifting the detail set-up pins 127 out of cooperative relative to said tumbler pins 91. On the following machine cycle the master tag will be fed to the information sensing station X (Fig. 5) and master information punched in the master tag will be sensed and set-up in the master set-bar basket K. Assume now that the second tag fed from magazine 82 to control station L is a detail tag the machine will then be conditioned to receive detail information and when the detail tag reaches the information sensing station X and the information therein is sensed, such detail information will be set-up in the detail set-bar basket K. The accumulated or previously recorded master information in master set-bar backet K sensed from the master tag will then be simultaneously punched into a tabulating card B with the detail information sensed from the second or detail tag and at the end of the machine cycle the detail information will be retracted or wiped out of the detail set-bar basket K but the master information in master set-bar basket K will be retained until a second master tag is fed to the control sensing station L. Thus it will be seen that the same master information is punched into every card simultaneously with all detail information sensed from succeedingly fed detail tags until a new master is fed to clear the machine and set up new master information in the master set-bar basket K.

Another feature of the operation of the machine is that only the last price punched in the detail tags is set-up and punched in the tabulating cards when detail tags are being sensed. All other prices punched in detail cards are sensed but the set-up is blocked out by the three reprice slides 216, **216*a* and 216*b* as heretofore described. Conversely, all prices punched in master tags are sensed, set-up and punched since the slides 216, 216*a* and 216*b*** are free to move out of blocking position during a master cycle of the machine.

While there is shown and described herein certain structure embodying the invention, it is to be understood that the invention is not limited thereto or thereby but embraces all changes and modifications in its various features which come within the scope of the appended claims.

The invention claimed is:

1. A tag controlled card reproducing machine comprising the combination of: means for successively feeding interspersed master tags and detail tags to a control sensing station; control sensing means at said control sensing station operative to automatically condition the machine for receiving master information after master tags are fed to said control sensing station and detail information after detail tags are fed to said control sensing station; and means to provide for selective and automatic allocation of master information sensed from a master tag to one or more fields of a tabulating card and detail information sensed from a detail tag to another field or fields on the same tabulating card.

2. A record controlled record reproducing machine comprising the combination of: means for feeding interspersed master records and detail records to a control sensing station; control sensing means at said control sensing station; an information sensing station; information sensing means at said last named station; a decoding and recoding unit selectively responsive to said information sensing means; actuated means including a group of actuated elements for master information and a group of actuated elements for detail information; and means operable through said control sensing means to selectively position one or the other of said groups of actuated elements into cooperative relation with said recoding unit for transmitting information sensed from said records at said record sensing station.

3. A record controlled record reproducing machine comprising the combination of: means for feeding records, first to a control sensing station, and then to an information sensing station; control sensing means at said control sensing station to distinguish between master records and detail records; information sensing means at said information sensing station; information decoding mechanism controlled by said information sensing means; information recoding mechanism controlled by said information decoding mechanism; recording mechanism controlled by said information recoding mechanism; and means controlled by said information sensing means to block out any set-up in the information decoding, recoding and recording mechanisms in the absence of a record at said information sensing station.

4. A record controlled record reproducing machine as claimed in claim 3, wherein the information sensing means includes a plurality of sensing wires; a plurality of spring loaded pins, one for each wire; a plurality of pivoted latches, one for each pin; and an oscillating unit normally acting to hold said latches in their unlatched position with respect to said decoding mechanism.

5. A record controlled record reproducing machine as claimed in claim 3, wherein the decoding mechanism comprises a plurality of rows of spring loaded pins; a plurality of rows of spring loaded decoding slides cooperable with said pins; and reciprocating means cooperating with said slides to block and release their corresponding spring loaded pins during each operating cycle of the machine.

6. A record controlled record reproducing machine as claimed in claim 3, wherein the information recoding mechanism comprises a plurality of rows of information recoding pins which are in axial alignment with their respective rows of spring loaded decoding pins; a plurality of pivotally mounted tumbler pins cooperable with each row of recoding pins; and means to reciprocate said tumbler pins relative to said recoding pins and toward and from said recording mechanism during each operating cycle of the machine.

7. A tag-controlled card reproducing machine of the class described comprising the combination of: control sensing means; information sensing means; information decoding means controlled by said information sensing means; information recording means controlled by said information decoding means including rows of tumbler pins; punch set-up mechanism controlled by said information recoding means comprising rows of spring loaded punch set-up pins; and means controlled by said control sensing means to shift certain of said rows of punch set-up pins into cooperative alignment with said tumbler pins while shifting other rows of said punch set-up pins out of cooperative alignment with said tumbler pins whereby the capacity of said punch set-up means is twice the capacity of said information sensing means.

8. In a tag controlled card reproducing machine, the combination of: a control sensing station; an information sensing station; means for successively feeding interspersed master tags and detail tags first to said control sensing station and then to said information sensing station including combined feeding and locating pins; control sensing means at said control sensing station; information sensing means at said information sensing station; a decoding and recoding unit normally responsive to and operated by said information sensing means to decode and recode information sensed from said master and detail tags by said information sensing means; control means interposed between said decoding unit and said information sensing means operable to control the operation of said decoding unit during the presence or absence of a tag adjacent said information sensing station in the transfer of information therefrom; and actuated means including two distinct groups of actuated elements selectively positioned beneath said recoding unit, said control sensing means distinguishing master tags from detail tags as well as the absence of a tag at said control sensing station and controlling one group of said actuated elements while said information sensing means controls the other group of said actuated elements.

9. In a tag-controlled card reproducing machine of the type described, the combination of a control sensing station; an information sensing station; means for successively feeding interspersed master tags and detail tags to said sensing stations; control sensing means at said control sensing station; information sensing means at said information sensing station, said last named means including a plurality of semi-flexible wires; means for moving said wires toward and from a sensing position at said sensing stations to sense information contained in said tags; a decoding unit; a recoding unit; control means actuated by said information sensing wires to control the operation of said decoding and recoding units respectively; and punch set-up means selectively actuated by said recoding unit to transfer recoded master information and detail information sensed from a master tag and a detail tag to plural fields of a tabulating card or the like, said control sensing means distinguishing master tags from detail tags at said control sensing station and operating said recoding unit and punch set-up means to transfer information according to the sensing of a master or detail card.

10. In a tag controlled card reproducing machine as claimed in claim 8 wherein the control means interposed between said decoding unit and information sensing means comprises a plurality of pivoted latches selectively moved by said information sensing means for controlling the operation of said decoding means.

11. In a tag controlled card reproducing machine as claimed in claim 8 wherein the actuated means selectively operable by and in response to the operation of said recoding unit comprises two sets of spring loaded pins.

12. In a record controlled record reproducing machine, the combination of a sensing station; means for successively feeding interspersed master and detail records to said station; sensing means at said sensing station adapted to sense coded perforated information in the records; a decoding unit adapted to convert the coded perforated information in the records into a different code; control means interposed between said sensing means and said decoding unit operable by said sensing means to control said decoding unit; a recoding unit controlled by said decoding unit including a plurality of translator pins and a plurality of corresponding tumbler pins controlled by said translator pins; a group of master information set-up pins; a group of detail information set-up pins, said groups being selectively shiftable for registration with said tumbler pins through means including said sensing means; and actuated means selectively operable by and under control of said groups of master and detail set-up pins to record recoded information in other records in accordance with the coded information sensed from said master and detail records.

13. A tag controlled card reproducing machine comprising: a control sensing station; an information sensing station; means for successively feeding interspersed master and detail tags first to said control sensing station and then to said information sensing station; control sensing means at said control sensing station adapted to sense control information in said master tags to condition the machine for a maser cycle; information sensing means at said information sensing station adapted to sense information from either master or detail tags; a decoding unit operable to convert coded information sensed from said master and detail tags into a different code; a recoding unit cooperable with and actuated by said decoding unit; said recoding unit including a plurality of tumbler pins; a group of master information set-up pins; a group of detail information set-up pins; means actuated by said control sensing means to shift said group of master information set-up pins into registration with said tumbler pins when a master tag is sensed at said control sensing station; said last named means also acting to shift said group of detail information set-up pins into registration with said tumbler pins when a detail tag is sensed at said control sensing station; and actuated means selectively operable by and under control of said master and detail information set-up pins to simultaneously decode, recode and record information sensed from a master tag and a detail tag into the same tabulating card.

14. A record controlled record reproducing machine as claimed in claim 3 wherein, the means controlled by said information sensing means serving to block out any set-up in the decoding, recoding and recording mechanisms in the absence of a record at said information sensing station comprises a plurality of spring-loaded pins actuated by said information sensing means; a pivoted latch for each of said pins; and a spring-loaded decoding slide for each latch.

15. In a tag controlled card reproducing machine comprising: a control sensing station; an information sensing station; tag feeding means for successively feeding interspersed master tags and detail tags to said control sensing station and then to said information sensing station; control sensing means at said control sensing station; information sensing means at said information sensing station; means for converting coded information sensed from said master tags and detail tags by said information sensing means into a different code including a decoding and recoding unit; punch actuating means including two distinct groups of punch set-up pins; means actuated by said control sensing means to position one of said groups of pins into cooperative relation beneath said recoding unit when a master tag is fed to said sensing station, and the other of said groups of pins into cooperative relation beneath said recoding unit when a detail tag is fed to said control sensing station; and a plurality of punches selectively controlled by said punch set-up pins for simultaneously punching information sensed from a master tag into one field of a tabulating card and information sensed from a detail tag into another field or fields of the same tabulating card.

16. In a tag controlled card reproducing machine as claimed in claim 15 wherein means including a set-bar basket is provided for storing information sensed from a master tag for repetitive machine cycles and until it is automatically cleared by a subsequently fed master tag.

17. In a tag controlled card reproducing machine as claimed in claim 15 wherein means including a set-bar basket is provided for storing information sensed from a detail tag for one machine cycle only and then cleared at the end of such cycle.

18. In a tag controlled card reproducing machine as claimed in claim 13 wherein the means for shifting the two distinct groups of punch set-up pins also serves to actuate means for blocking out the sensing of selected information from detail tags but allows such blocked out information to be sensed from their associated master tag, said last named means including a plurality of offset plates having apertures therein cooperating with said tumbler pins.

19. A tag controlled card reproducing machine comprising: a control sensing station; an information sensing station; means for intermittently feeding interspersed master tags and detail tags first to said control sensing station and then to said information sensing station; control sensing means for sensing said tags at said control sensing station to distinguish between a master tag and a detail tag; information sensing means for sensing perforated information from said tags at said information sensing station; card feeding means; card punching means including a plurality of punches; a decoding and recoding unit controlled by said information sensing means for converting coded information sensed from said tags at said information sensing station into a different code; and means actuated by said recoding unit for setting said punches to record master information sensed from a master tag into one or more fields of a tabulating card and information sensed from a detail tag into another field or fields of the same tabulating card.

20. The invention as claimed in claim 19 in which the last named means comprises a group of master information punch set-up pins and a group of detail information punch set-up pins, and means under the control of said control sensing means to shift said master information punch set-up pins into cooperative relation with said recoding unit when a master tag is sensed at said control sensing station, and to shift said detail information punch set-up pins into cooperative relation with said recoding unit when a detail tag is sensed at said control sensing station.

21. The invention as set forth in claim 19 in which means are provided for sensing and punching all price information punched in a master tag but only the last price punched in a detail tag, said means including a plurality of tumbler pins actuated by said recoding unit; a plurality of apertured off-set plates cooperating with said tumbler pins; and means controlled by said control sensing means for shifting said plates when a master tag is fed to said control sensing station for selectively positioning said offset-plates to control said tumbler pins so that all price information may be sensed and punched from a master tag but only the last price from a detail tag.

References Cited in the file of this patent

UNITED STATES PATENTS

| | | |
|---|---|---|
| 1,791,950 | Bryce | Feb. 10, 1931 |
| 2,045,977 | Bryce | June 30, 1936 |
| 2,160,152 | Kelley | May 30, 1939 |
| 2,381,361 | Mueller | Aug. 7, 1945 |
| 2,598,511 | Crowell | May 27, 1952 |